Patented May 20, 1930

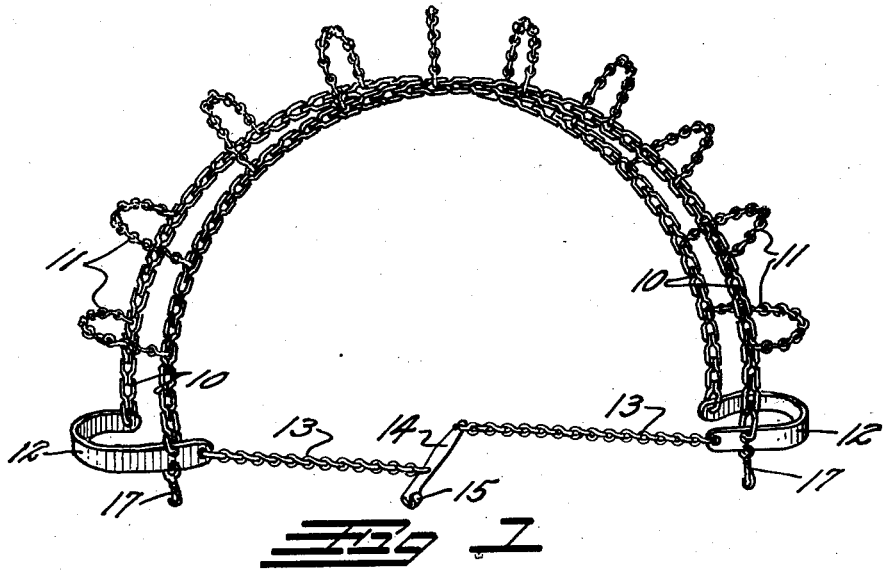
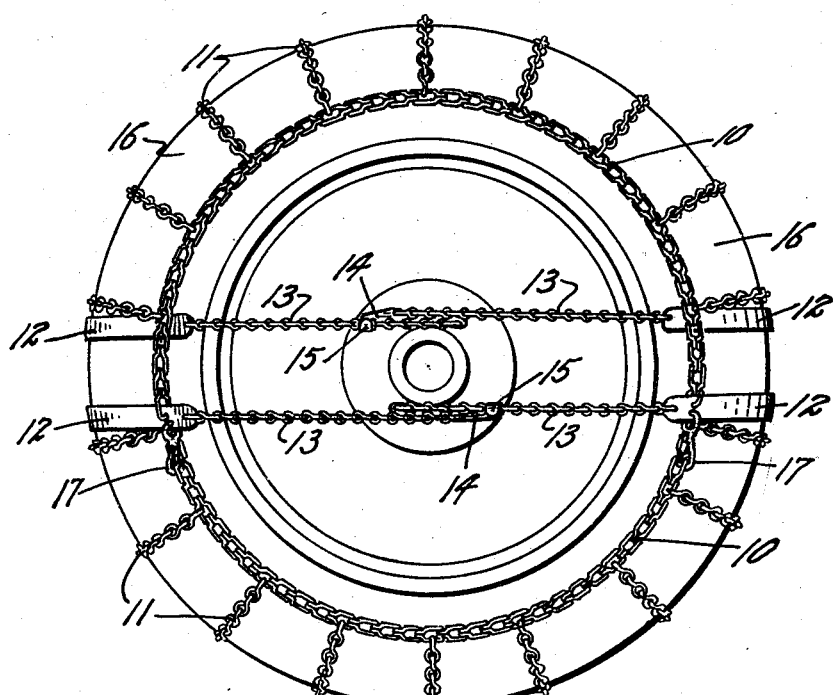

1,758,944

UNITED STATES PATENT OFFICE

CARL E. GROSCH, OF STURGIS, SOUTH DAKOTA

NONSKID CHAIN

Application filed August 15, 1927. Serial No. 212,888.

This invention relates to a non-skid chain for automobiles and other automotive vehicles. With the present types of non-skid chains, it is impossible to attach or use the chain after the vehicle has become fast in a mudhole. The principal object of this invention is to provide a chain which can be attached to a wheel while the wheel is in contact with the ground or embedded in mud.

With the present types of chains, it is necessary to reach around in back of the wheel in order to fasten the inner chain. This results in soiling of the clothing and hands and results in great inconvenience. Another object of the invention is to provide a tire chain which can be placed on the wheel without it being necessary to reach around in back of the wheel.

A further object of the invention is to provide a tire chain which may be quickly put in place without it being necessary to jack up the wheel.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of a section of my improved tire chain. The complete chain for a wheel consists of two of these sections.

Fig. 2 is a side elevation of a wheel with the two sections forming the complete tire chain applied thereto.

The chain comprises two circumferential chains 10 of a length slightly exceeding half the circumference they will occupy when on the wheel. The circumferential sections 10 are joined by the usual tread chains 11 and connect at their extremities with U-shaped bands 12. The bands 12 are cross connected by means of tie chains 13 joined by a connecter 14. The connecter 14 may be any of the usual types of chain connecters preferably of the type illustrated which will place the tie chains under tension and having a hook 15 adapted to be hooked over one of the chains 13, when the connecter is brought in alignment therewith, as shown in Fig. 2.

Should the automobile be fast in mud so that the rear wheels have no traction, one section of the chain is placed over the upper half of each of the rear wheels and clamped in place as previously described. The motor is then started. The wheels slipping in the mud will drag this half downwardly into the soft mud allowing the other half of the chain to be put into place.

It is often unnecessary to place the second half on the wheels until after the automobile has released itself from the mudhole since the sections already in place give sufficient traction to allow the wheels to free themselves.

It is desired to call attention to the fact that it is not necessary to reach around the wheel to put the chain in place. The U-shaped bands 12 when placed around the tire automatically place and hold the inner circumferential chain in its proper position.

If desired, snap hooks 17 may be carried by the bands 12 and after the two sections of the chain are in place these hooks can be snapped onto the adjacent circumferential sections as shown in Fig. 2 to more securely hold the chain in place.

The U-shaped bands are preferably made of spring steel or similar flexible material so that they will flex with the tire.

While a specific form of the improvement has been described and illustrated herein, it is desired to be understood that the same may be varied, within the scope of the appended claim, without departing from the spirit of the invention.

Having thus described the invention, what I claim and desire to secure by Letters Patent is:—

A tire chain comprising: the combination of a pair of U-shaped bands adapted to be placed around the tread portion of said tire; an inner circumferential chain secured to the rear extremity of each of said bands; an outer circumferential chain secured adjacent the outer extremity of each of said bands, said circumferential chains having a length exceeding half the circumference of said tire; tread chains spaced along and joining said circumferential chains throughout their length; legs on the outer extremities of said bands extending in a common plane toward the axis of said tire and within the circumference defined by said circumferential chains; and a tie member secured to the extremity of each of said legs and arranged to cross the outer face of said tire, said legs having a sufficient length so that any tendency of said bands to slip around said tread portion toward the outside will act to increase the tension in said tie member.

In testimony whereof, I affix my signature.

CARL E. GROSCH.